(12) United States Patent
Haining

(10) Patent No.: US 7,595,914 B2
(45) Date of Patent: Sep. 29, 2009

(54) PORTABLE PHOTO SCANNER WITH TASK ASSIGNER

(75) Inventor: David S Haining, Greeley, CO (US)

(73) Assignee: Hewlett Packard Development Company, L.P., Houston, TX (US)

( * ) Notice: Subject to any disclaimer, the term of this patent is extended or adjusted under 35 U.S.C. 154(b) by 1984 days.

(21) Appl. No.: 09/838,981

(22) Filed: Apr. 20, 2001

(65) Prior Publication Data

US 2002/0154342 A1  Oct. 24, 2002

(51) Int. Cl.
*H04N 1/04* (2006.01)
*H04N 1/40* (2006.01)
*H04N 1/00* (2006.01)

(52) U.S. Cl. .................... 358/474; 358/473; 358/403; 358/442; 358/402; 358/444; 358/468; 358/296

(58) Field of Classification Search ......... 250/234–236; 358/468, 444, 409–410, 1.15, 117, 403, 1.16, 358/1.13, 402, 473, 472, 296, 474, 442; 382/305, 382/306, 312, 313; 386/117; 348/231.2, 348/231.3, 231.99, 231.1, 207.1, 207.11, 348/207.2

See application file for complete search history.

(56) References Cited

U.S. PATENT DOCUMENTS

| 5,539,535 A | * | 7/1996 | Aizawa et al. ............... 358/468 |
| 5,706,457 A | | 1/1998 | Dwyer et al. |
| 6,054,707 A | * | 4/2000 | Hou .......................... 250/234 |
| 6,167,469 A | | 12/2000 | Safai et al. |
| 6,369,908 B1 | * | 4/2002 | Frey et al. .................. 358/1.15 |
| 6,658,202 B1 | * | 12/2003 | Battaglia et al. ............ 386/117 |

FOREIGN PATENT DOCUMENTS

| EP | 0278004 A1 | 8/1988 |
| EP | 1154631 A2 | 11/2001 |
| WO | WO0195269 A2 | 12/2001 |

* cited by examiner

*Primary Examiner*—Cheukfan Lee

(57) ABSTRACT

A preferred embodiment for the inventive portable picture storage device comprises an input for receiving a plurality of pictures, a storage area for storing the plurality of pictures, and a plurality of user interface indicator. Each indicator is associated with a respective meta data of a plurality of meta data, and each meta data indicates at least one disposition of a plurality of dispositions. At least one picture of the plurality of pictures is associated with a meta data and thereby at least one disposition, via activation of an indicator.

17 Claims, 3 Drawing Sheets

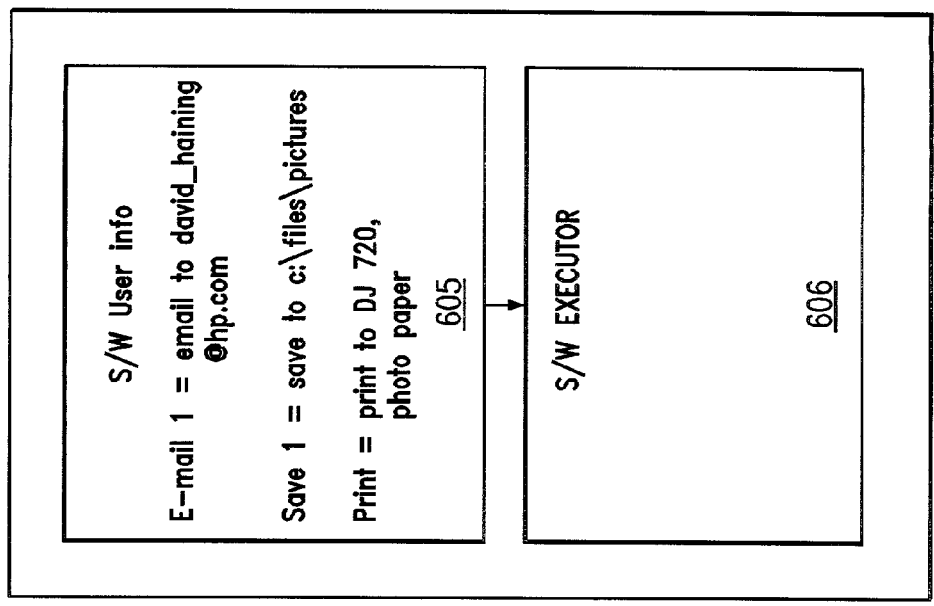
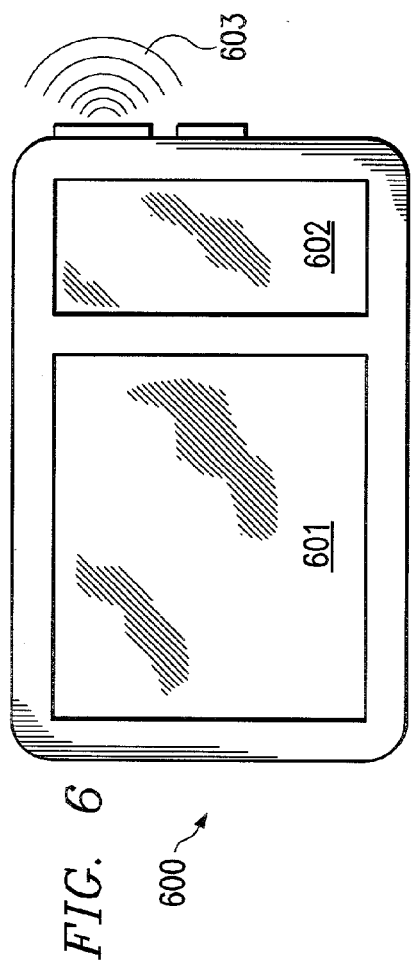
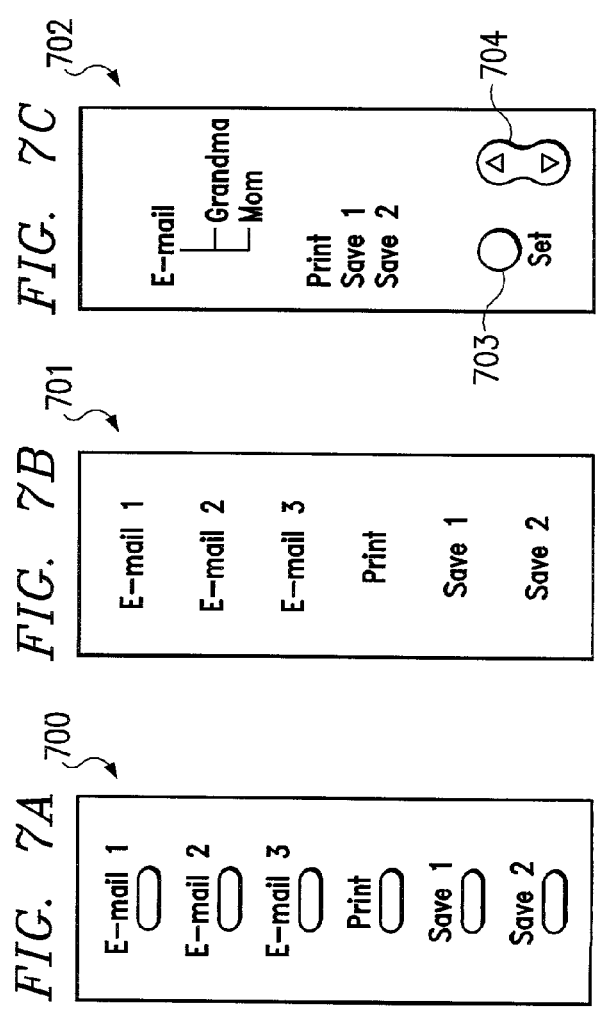

PORTABLE PHOTO SCANNER WITH TASK ASSIGNER

BACKGROUND

Although digital cameras are becoming more and more prevalent, many users still use film cameras to record images. After processing, the negatives and the paper pictures or photographs are returned to the photographer. The photographer may then decide to convert some of the pictures into digital pictures. This conversion is typically accomplished by using a scanner. Scanners are directly attached to a computer or computing like device (e.g., set top box), which is typically located in the home or at work.

The photographer typically reviews photographs in a location that is distant from the computer. For example, the home computer may be located in a home office, while the photographer reviews the photographs in the kitchen or family room. The photographer may review the photographs in the car after purchasing the prints at the store. Thus, the photographer or user is not typically near the scanner when the user reviews the photographs. Consequently, scanning decisions that the user made regarding photographs cannot be readily carried out, but rather must wait until the user is in the same room as the scanner. Thus, unless the decisions were written down in some manner, the decisions are likely to be forgotten, delayed or postponed, or confused with other decisions. For example, the user may decide to digitize some pictures for use in projects such as web pages, and not others; to e-mail some digitized pictures to family or friends and not others; and/or store other digitized pictures on recordable media (CD, floppy disk, zip disk, hard disk etc.) and/or digitize and reprint using a local printer or an Internet printing service.

Also, a person may wish to obtain copies of a photograph that belongs to another photographer. This would require the person or the photographer to either order copies of the photograph at a store, or take the photograph to a computer that included an attached scanner. For example, a user visiting a relative's house may want to obtain copies of photographs that belong to the relative.

In both scenarios, the user is at a disadvantage, because the user cannot make scan copies of photographs when the user is viewing the photographs and mark them with a desired disposition. The user must either take the photographs to a store to be copied, or take the photographs to a computer that has an attached scanner.

SUMMARY OF THE INVENTION

The present invention is directed to a system and method which allows a user to mark at least one desired disposition on digitally scanned pictures at locations that are remote from a computer.

A preferred embodiment for the inventive portable picture storage device comprises an input for receiving a plurality of pictures, a storage area for storing the plurality of pictures, and a plurality of user interface indicator. Each indicator is associated with a respective meta data of a plurality of meta data, and each meta data indicates at least one disposition of a plurality of dispositions. At least one picture of the plurality of pictures is associated with a meta data and thereby at least one disposition, via activation of an indicator.

A preferred embodiment for the inventive system for managing disposition of a plurality of pictures comprises an input means for receiving a plurality of pictures, a storage means for storing the plurality of pictures, and means for indicating at least one disposition of a plurality of dispositions. At least one picture of the plurality of pictures is associated with the at least one disposition of the plurality of dispositions, via the means for indicating.

A preferred embodiment for the inventive method for managing disposition of a plurality of pictures, comprises receiving a plurality of pictures, storing the plurality of pictures, and associating an indication of at least one disposition of a plurality of dispositions with at least one picture of the plurality of pictures.

BRIEF DESCRIPTION OF THE DRAWING

FIG. 6 depicts an alterative arrangement of the scanner of FIG. 1; and

FIGS. 7A-7C depict arrangements for the buttons to be used with the scanners of FIGS. 1 and 6.

DETAILED DESCRIPTION

Figure 1:
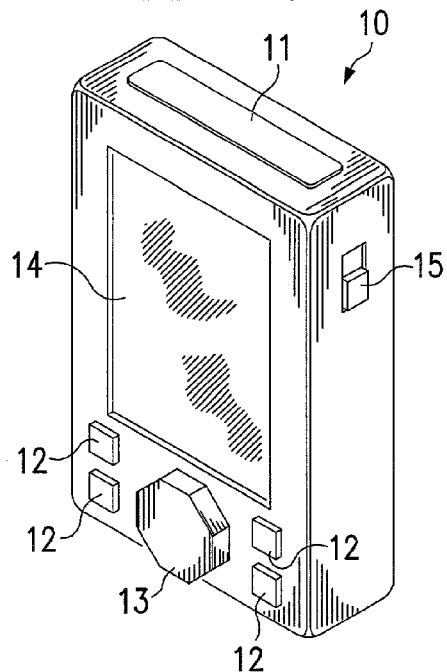
FIG. 1 depicts the invention embodied in a scanner.

The present invention allows a user to digitally scan pictures at locations that are remote from a computer or computing like device (e.g., set top box) and mark them with a desired disposition. The inventive scanner can then store the digital pictures until being interfaced with a computer, which would then allow the stored pictures to be downloaded to the computer and the disposition to be automatically executed. The inventive scanner can preferably operate attached to the computer or as a remote device. Consequently, the inventive scanner can preferably serve as both a scanner attached to a computer and a portable scanner that can scan and store images remote from the computer.

When connected to the computer, the inventive scanner is preferably inserted into a docking station, that is connected to the computer via cables. Additionally, the inventive scanner may include a wireless connection (e.g., infra-red or BLUETOOTH port), which would allow the scanner to have an infra-red link with the computer. The docking station would also provide power to the scanner. When operating remote from the computer, the inventive scanner preferably includes memory storage and battery power. This allows users to scan desired pictures or other images when the user is first looking at the pictures, and/or when it is otherwise convenient for the user. Moreover, the portability allows the user to select a desired location to perform the scanning. The inventive scanner may also optionally include a modem or wireless modem for connection with the Internet. This would facilitate easier e-mailing of desired images.

The inventive scanner also preferably includes a plurality of task assigning or intent buttons. These buttons may be either pre-programmed or user programmed. The buttons may be actual buttons and/or locations on a touch screen. The buttons may also comprise other interfaces such as rocker bars, rocker buttons, and/or joysticks. The task buttons would allow a user to associate a desired disposition for each picture, e.g. e-mail, store to disk, get additional copies, change size, image processing, paper print, etc. Theses buttons allow users to make real time decisions regarding the disposition of the images. In other words, as the user is scanning in pictures, the user may also select a disposition for the images. Alternatively, the user may select dispositions for the images at a later time, e.g. after the pictures have been downloaded to the computer. In any event, the computer would receive the downloaded images along with their associated disposition information. The computer would then preferably act on the disposition information automatically upon downloading the images. For example, the computer would e-mail the designated pictures, print the designated pictures, and/or store the designated pictures.

The inventive scanner may also optionally include a screen, e.g. LCD display. This would allow the user to remotely review the stored pictures and edit or change their respective dispositions before being downloaded to the computer or e-mailed over the optional modem. The display may also be a touch screen which would assist the user in marking dispositions and editing the pictures.

Note that the invention has been described in terms of a scanner. However, some aspects of the invention may be used on a digital camera, video camcorder, or any other digital capture device, e.g., the marking of pictures with a desired disposition.

Although the invention is described via computer embodiments for providing user selected dispositions of pictures, it shall be appreciated that other devices may be utilized. Specifically, the present invention may be practiced utilizing non-personal computer devices. For example, an Internet appliance may receive the pictures and meta data from an inventive scanner via a docket station. The Internet appliance may possess any suitable processor, volatile and non-volatile memory, and appropriate executable instructions to perform the selected dispositions. Additionally, the Internet appliance may possess a communication connection to facilitate communication of the pictures. For example, an Internet capable wireless phone possessing appropriate executable instructions may be utilized. Alternatively, the Internet appliance may communicate the pictures and meta data to a remote computing device where the dispositions are performed. For example, the Internet appliance may utilize a file transfer protocol (FTP) to transfer the pictures and meta data. Accordingly, it shall be appreciated that any reference to computer shall refer to any appropriate device capable of performing the desired dispositions including, but not limited to, personal data assistants (PDAs) with Internet capabilities, set top boxes, web tablets, e-mail stations, Internet appliances, cellular telephones with Internet capabilities, and/or the like.

FIG. 1 depicts the inventive scanner 10 with input plate 11, which is the input surface for scanning the picture or other image. Note that the size and location of the input plate is by way of example only, as the plate can be of a different size and placed in a different location. With this embodiment, the scanner is moved across the picture to be scanned in, or the picture is moved across the plate 11. Note that the term "picture" is meant to encompass any possible data that can be scanned and stored in an image format, including but not limited to text, photographs, newspaper or magazine articles and pictures, three-dimensional objects, et cetera. In a preferred embodiment, either the scanner 10 is moved across the picture to be scanned or the picture is moved across the scanner. Alternatively, if the plate 11 is of a sufficient size, the scanner and picture may both be stationary, and an internal mechanism (not shown) would move a scanning bar (not shown) across the plate 11 and thereby scan the image.

The inventive scanner 10 may include an optical detector such as a charge-coupled device (CCD), cathode ray tube, and/or the like. The optical detector may include an appropriate lens system to focus the image onto the detector.

The inventive scanner 10 includes internal memory storage, e.g. RAM memory, of a sufficient size to store a plurality of pictures. Additional memory may be added by inserting flash cards, PC cards, or other non-volatile memory elements e.g. miniature disks or memory sticks. The inventive scanner 10 also includes an internal power supply, e.g. battery, that is capable of powering the operations of the scanner for a plurality of hours. Additional power may be supplied by using battery packs that fit on to the inventive scanner.

The inventive scanner 10 also includes disposition buttons 12. These buttons are used to mark pictures as they are scanned with meta data. Meta data is information that describes a characteristic of the picture with which it is associated. These buttons may be either pre-programmed or user programmed. Each button would mark a picture with a specific meta data marker. For example, one specific meta data marker could indicate that any picture tagged with the meta data would be printed. Another meta data marker could indicate that the picture will be stored to a specific location on a hard drive, Zip drive, floppy drive, etc. Another meta data marker could indicate that the picture will be stored to a CD disc, DVD disc, etc. Another meta data marker could indicate that the picture will be e-mailed to a particular user. Note that one or more buttons could be used in conjunction with each other to allow the user to review a plurality of potential e-mail recipients and select one or more recipients to receive the e-mail. Still other meta data could indicate that the picture needs to be image processed, e.g. change in size, change in shape, change in magnification (zooming), change in orientation, addition of graphics or texts to the picture, editing of color, adding special visual effects, et cetera.

Note that the buttons are by way of example only, as other user interfaces could be used to associate meta data with the pictures. For example, screen 14 could be a touch screen that would permit a user to select button portions on the screen to associate meta data with either a finger or a stylus. Rocker button 13 could also be used to associate meta data. Also joysticks and/or rocker bars could be used as well. Moreover, a combination of one or more of the buttons 12, rocker button 13, touch screen 14, joystick, rocker bars could be used to associate meta data.

Further note that more than one meta data may be associated with a single picture. For example, a user may desire that the picture be printed on paper, stored in the picture file of the hard drive, and e-mailed to the user's parents. To cause these dispositions to occur, the user would push (or activate) the specific buttons associated with the desired meta data.

The scanner 10 optionally includes screen 14 for displaying information to a user. Screen 14 may be a LCD screen capable of displaying the pictures stored in the scanner. This would permit the user to view the stored pictures and the meta data associated with the pictures. Thus, the user could then change or add to the meta data. The screen 14 may also be a touch screen. This would enhance the user's ability to view the pictures and edit the meta data. By being able to view the images, the user can select a disposition for each picture at a time that is subsequent to the scanning in of the pictures.

Figure 2:
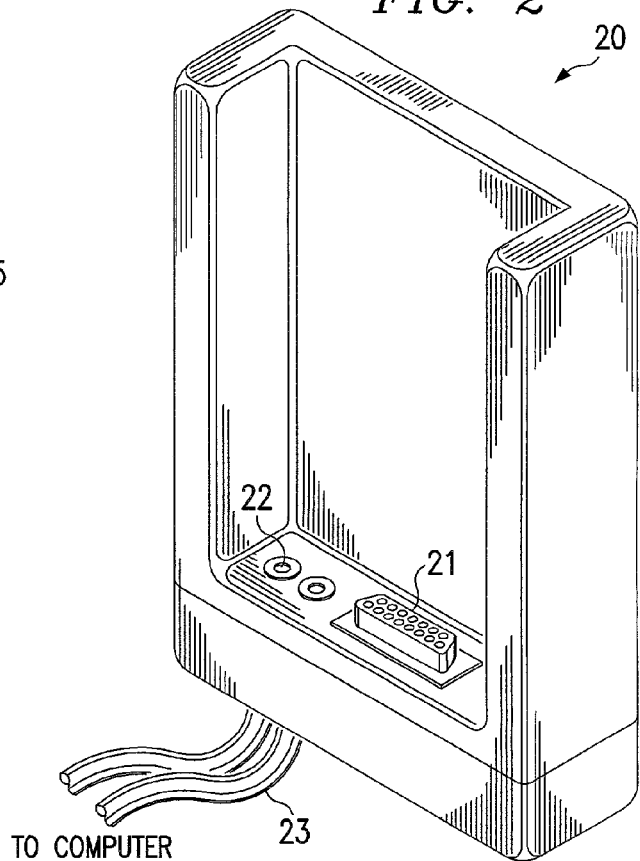
FIG. 2 depicts a docking station for the scanner of FIG. 1.

FIG. 2 depicts an example of a docking station 20 for the scanner 10. The docking station includes a power connector 22, which would provide power to the scanner 10 and/or recharge the power source (e.g. battery) of the scanner 10, via cable(s) 23. Note that the scanner may draw power from a computer or from a wall outlet. The docking station also includes data connection 21. This permits data to flow between the scanner 10 and a computer, via cable(s) 23. The data connection can be a serial, parallel, USB, Firewire, wireless, etc. connection. Note that the appearance of the docking station 20 is by way of example only, as other mechanisms for connecting the scanner 10 to a computer can be used. For example, the scanner could include an infra-red port 15 which would allow the scanner 10 to link with a computer that has a similar infra-red port. The scanner 10 would be able to operate as a scanner while in the docking station 20.

Figure 3:
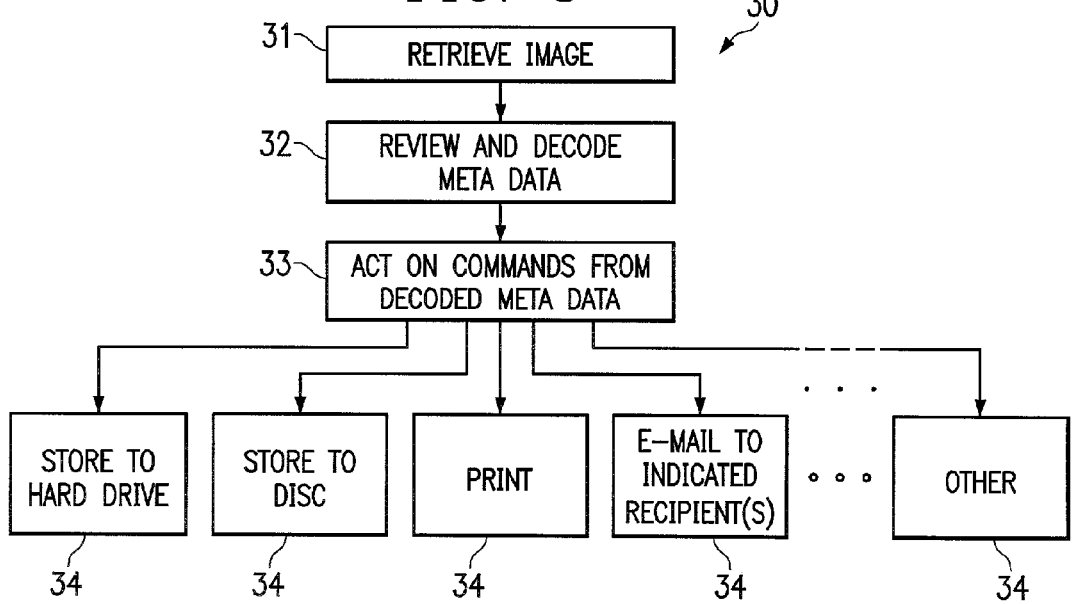
FIG. 3 depicts a first embodiment for processing the pictures stored in the scanner of FIG. 1.

FIG. 3 depicts the flow of operations 30 that a computer performs in downloading pictures from the scanner 10. The computer would first retrieve 31 a picture or image file from the scanner 10. The computer would then review 32 the meta data associated with the picture file and decode the meta data into commands that are useable by the computer. The meta data could be appended on to the picture data or the meta data could be stored elsewhere in the scanner memory and be associated with the picture data by a pointer. Note that it is assumed that each picture will have some meta data associated with it, including deleted or wastebasket meta data. However, if the user did not select a disposition, and hence cause meta data to be associated with the picture, then a default disposition would preferably be assigned to the picture by the scanner, prior to downloading, e.g. store to hard drive. The default may be selectable by the user. After reviewing and decoding the meta data, the computer would then act 33 on the commands, and provide the picture at least one of a plurality of dispositions 34, e.g. store to hard drive, store to disc, print, e-mail, etc., without any further prompting by the user. For example, if the picture had meta data for e-mailing the picture to the user's parents, e-mailing the picture to the user's brother, printing the picture, and storing the picture in the my_picture folder on the hard drive, then the computer would send two e-mails, print one picture, and store the picture onto the hard drive. Note that other meta data can indicate a need for processing the image. The meta data could be used to invoke an image processing program stored on the computer, and cause it to make predetermined enhancements to the picture before acting on other meta data, e.g. before storing the picture to the hard drive. Such enhancements could include change in size, change in shape, change in magnification (zooming), change in orientation, addition of graphics or texts to the picture, editing of color, adding special visual effects, et cetera.

Figure 4:
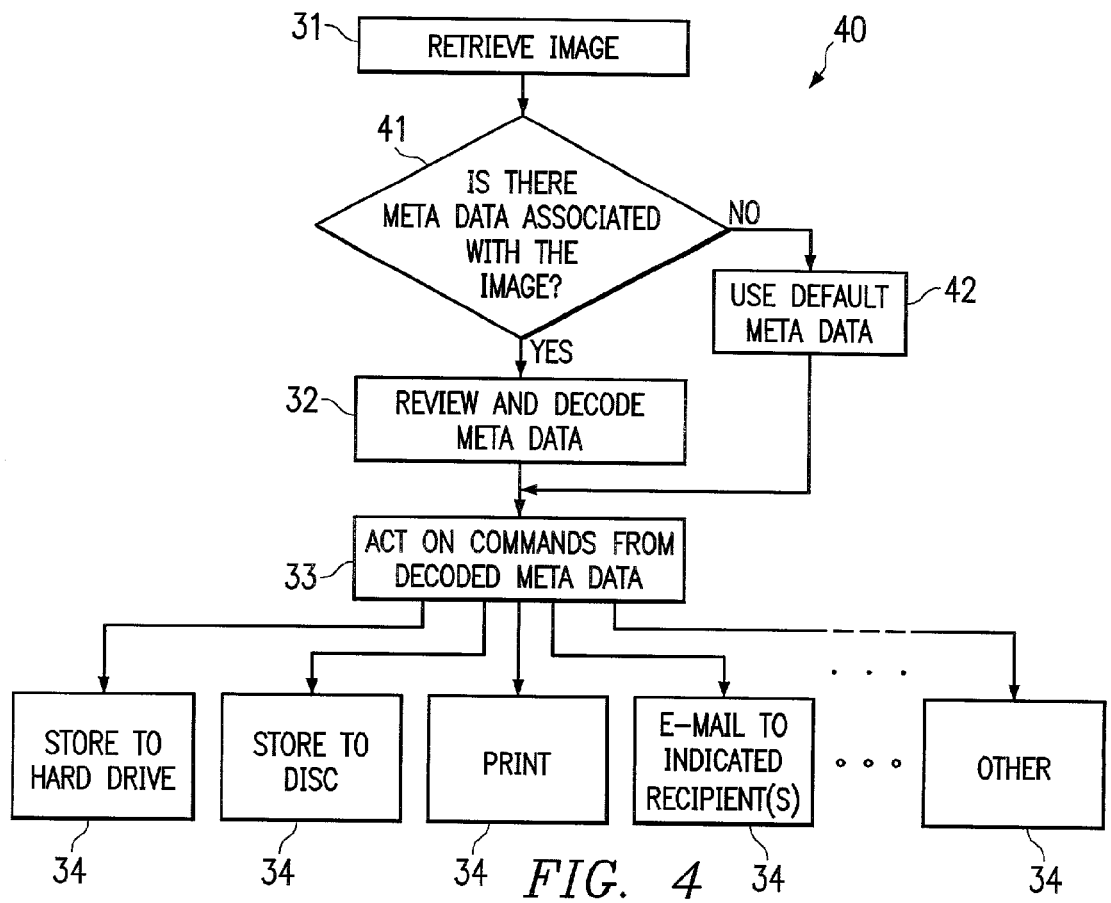
FIG. 4 depicts a second embodiment for processing the pictures stored in the scanner of FIG. 1.

An alternative embodiment is shown in FIG. 4. This embodiment 40 is similar to the embodiment 30 of FIG. 3, but in this case it is not assumed that each picture will have some meta data associated with the picture. Thus, the computer determines 41 whether there is meta data associated with the picture, before reviewing and decoding 32 the meta data. If there is data, then the operation continues as normal. If there is not meta data, then the computer associates 42 a default disposition with default meta data to the picture, e.g. store to hard drive. The default may be selectable by the user.

When implemented in software, certain elements of the present invention are preferably code segments that perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 5:
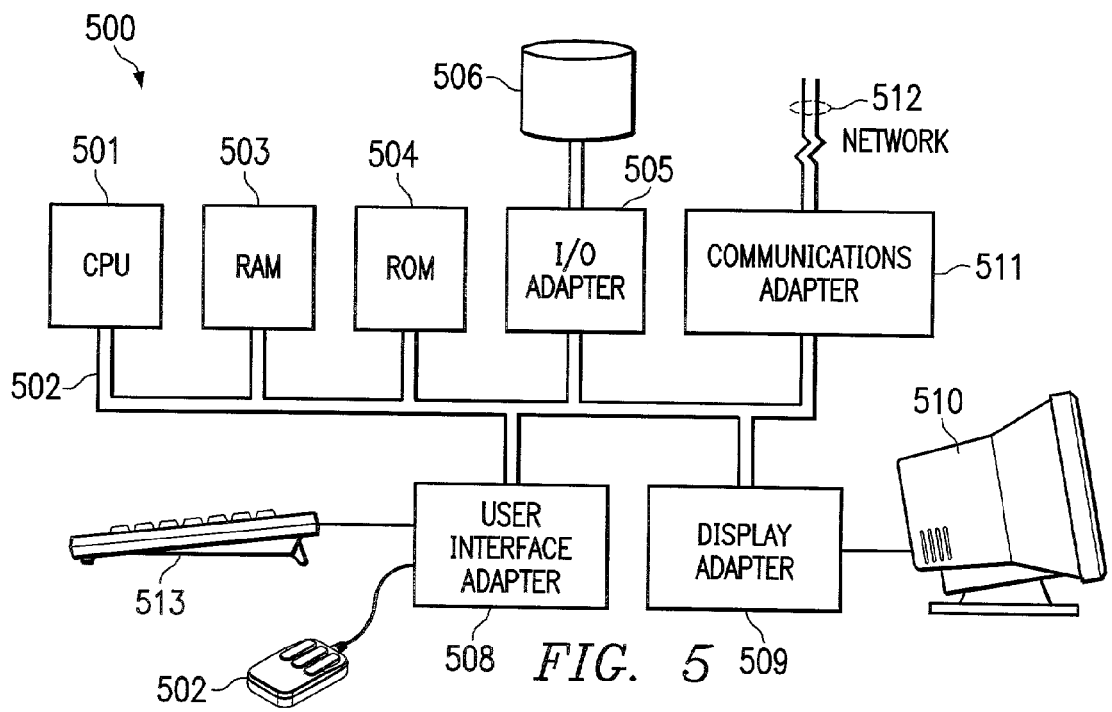
FIG. 5 depicts a block diagram of a computer system which is adapted to use the present invention.

FIG. 5 illustrates computer system 500 adapted to use the present invention. Central processing unit (CPU) 501 is coupled to system bus 502. The CPU 501 may be any general purpose CPU, such as an HP PA-8500 or Intel Pentium processor. However, the present invention is not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art.

Bus 502 is also coupled to input/output (I/O) controller card 505, communications adapter card 511, user interface card 508, and display card 509. The I/O card 505 connects to storage devices 506, such as one or more of a hard drive, a CD drive, a floppy disk drive, a tape drive, to the computer system. Communications adapter card 511 is adapted to couple the computer system 500 to a network 512, which may be one or more of a telephone network, a local (LAN) and/or a wide-area network (WAN), an Ethernet network, and/or the Internet network. User interface card 508 couples user input devices, such as keyboard 513 and pointing device 507, to the computer system 500. The display card 509 is driven by CPU 501 to control the display on display device 510. The docking station 20 would couple to the bus 502 via I/O adapter 505 and/or communications adapter card 511. Alternatively, the computer 500 would include an infra-red port that connects the bus 502 via I/O adapter 505 and/or communications adapter card 511.

The scanner 10 may also include a modem or wireless modem, which would provide for connection with the Internet, and permit immediate e-mailing of pictures with e-mailing meta data.

Note that the invention has been described in terms of using meta data with a scanner. However, any picture storing device could be used, e.g., a camera, a video camcorder, or any other digital capture device. Such devices may include a lens system and an optical detector.

FIG. 6 depicts an alternative embodiment for the inventive scanner 600. This embodiment uses input plate 601, which is of a sufficient size such that most pictures (3 inch by 5 inch) may be placed flat onto the plate and then scanned by the scanner. The scanner 600 includes button portion 602. This portion may include physical buttons 700 as shown in FIG. 7A, LCD screen touch pad buttons 701 shown as FIG. 7B, or a LCD screen 702 in combination with set button 703 and rocker switch 704 as shown in FIG. 7C. Note that as previously stated, other combinations of buttons and/or interfaces could be used. The inventive scanner 600 is shown to use an IR link 603 to communicate with the computer 604. Note that as stated above, a wire link could be used. The meta-data and pictures are downloaded to the computer 604. The software interface 605 converts the meta-data into processing commands, which are then carried out by the software executer 606.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A portable picture storage device comprising:
   an input for receiving a plurality of pictures;
   a storage area for storing the plurality of pictures; and
   a plurality of user interface indicators, wherein each indicator is associated with a respective meta data of a plurality of meta data, and each meta data indicates at least one disposition of a plurality of dispositions,
   wherein at least one picture of the plurality of pictures, via activation of an indicator, is associated with a meta data and thereby at least one disposition.

2. The portable picture storage device of claim 1 wherein:
   the one picture is associated with the meta data during storage into the device.

3. The portable picture storage device of claim 1 wherein the at least one disposition is selected from the group consisting of:
   printing, storing to another storage area, e-mailing to a recipient, image processing, and deleting.

4. The portable picture storage device of claim 1 wherein:
   the device is a camera and the input is a lens imaging system.

5. The portable picture storage device of claim 1 wherein:
   the device is a scanner and the input is a scanning mechanism.

6. The portable picture storage device of claim 1 wherein:
   the device is coupled to a computer system, which receives the one picture, and processes the one picture according to the meta data associated with the one picture.

7. A digital capture device, comprising:
   an input means for receiving a plurality of pictures;
   a storage means for storing the plurality of pictures; and
   means for indicating at least one disposition of a plurality of dispositions, the means for indicating associated with meta data for indicating the at least one disposition,
   wherein at least one picture of the plurality of pictures, via the means for indicating, is associated with said at least one disposition of the plurality of dispositions by associating the meta data with the at least one picture.

8. The digital capture device of claim 7 wherein:
   the one picture is associated with the at least one disposition during storage into the device.

9. The digital capture device of claim 7 wherein the at least one disposition is selected from the group consisting of:
   printing, storing to another storage area, e-mailing to a recipient, image processing, and deleting.

10. The digital capture device of claim 7 wherein the digital capture device comprises a camera.

11. The digital capture device of claim 7 wherein the digital capture device comprises a scanner.

12. The digital capture device of claim 7 further comprising:
    coupling means for connecting the device to a computer, wherein the computer includes means for receiving the one picture, and means for processing the one picture according to the at least one disposition associated with the one picture.

13. A method for managing disposition of a plurality of pictures on a digital capture device, comprising the digital capture device:
    receiving a plurality of pictures;
    storing the plurality of pictures; and
    associating an indication of at least one disposition of a plurality of dispositions with at least one picture of the plurality of pictures, the indication comprising meta data indicating the at least one disposition.

14. The method of claim 13 wherein:
    the step of associating is operative with the step of storing.

15. The method of claim 13 wherein the dispositions are selected from the group consisting of:
    printing, storing to another storage area, e-mailing to a recipient, image processing, and deleting.

16. The method of claim 13 wherein the digital capture device receiving a plurality of pictures comprises the digital capture device scanning the plurality of pictures.

17. The method of claim 13, wherein the digital capture device receiving a plurality of pictures comprises the digital capture device imaging the plurality of pictures.

* * * * *

UNITED STATES PATENT AND TRADEMARK OFFICE
CERTIFICATE OF CORRECTION

PATENT NO.         : 7,595,914 B2
APPLICATION NO.    : 09/838981
DATED              : September 29, 2009
INVENTOR(S)        : David S. Haining It is certified that error appears in the above-identified patent and that said Letters Patent is hereby corrected as shown below:

In column 1, line 3, above "BACKGROUND" insert
-- TECHNICAL FIELD
This invention relates in general to scanners, and in specific to a portable scanner. --.

In column 7, line 46, in Claim 7, before "meta" insert -- a --.

Signed and Sealed this

Twenty-sixth Day of October, 2010

David J. Kappos
*Director of the United States Patent and Trademark Office*